Oct. 27, 1936.    W. LA HODNY ET AL    2,058,603
MIRROR
Filed May 15, 1934    2 Sheets-Sheet 1

INVENTOR
William La Hodny &
BY Gust C. Hoff
Popp and Popp
ATTORNEYS

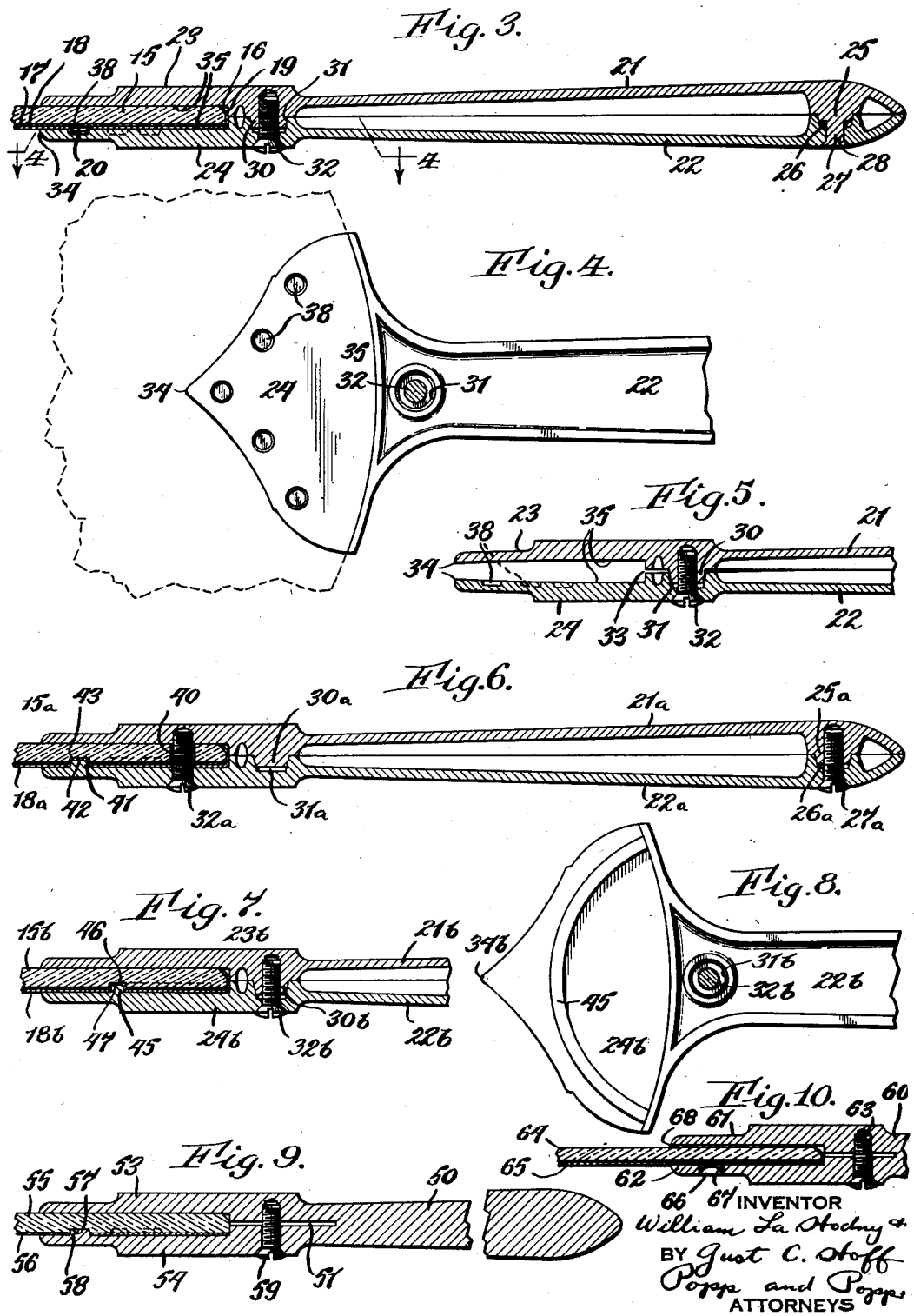

Patented Oct. 27, 1936

2,058,603

UNITED STATES PATENT OFFICE 2,058,603

MIRROR

William La Hodny and Gust. C. Hoff, Buffalo, N. Y., assignors to Standard Mirror Company, Inc., Buffalo, N. Y., a corporation of New York Application May 15, 1934, Serial No. 725,744

10 Claims. (Cl. 88—102)

This invention relates to a mirror and support therefor, such as a handle, and more particularly to a hand mirror and the principal object is to provide a hand mirror which is substantially frameless so that the entire obverse face is reflective and the hand mirror is larger, in effect, than the usual hand mirror of the same size.

In providing such a full-face mirror it is further essential to provide an entirely different means for connecting the handle to the mirror proper. In accordance with the present invention the mirror proper is clamped between the two parts of a bifurcated or two-piece handle which embraces both the obverse and reverse sides of the mirror proper and, in addition, positive means are provided for preventing the mirror proper from slipping out from the handle, it having been found to be impossible to secure a reliable connection by the provision of a clamping handle alone.

A further object of the invention is to provide a hand mirror having a bright metal back and a bright metal handle in keeping with the current tendency of design and to provide a handle which can be die cast, thereby permitting the hand mirror to be manufactured and sold at an extremely low price.

Another aim of the invention is to provide a two-part handle in which centering bosses are provided for insuring the proper fit of the two parts of the handle and, at the end of the handle embracing the mirror to arrange the extremities closer together than the inner parts of the jaws so that in applying the handle the mirror proper will first be gripped by the extremities and upon further tightening will be gripped by the inner parts of the jaws.

A further object of the invention is to provide such a hand mirror which is extremely attractive in appearance and which will fit in with any other dressing table accessories.

In the accompanying drawings:

Fig. 3 is a central longitudinal section.

Fig. 4 is a transverse section taken on line 4—4, Fig. 3.

Fig. 5 is a fragmentary view similar to Fig. 3 but showing the handle only.

Fig. 6 is a view similar to Fig. 3 showing a modified form of the invention.

Fig. 7 is a fragmentary view similar to Figs. 3 and 6 showing a further modified form of the invention.

Fig. 8 is a view similar to Fig. 4 and showing the modified form of the invention shown in Fig. 7.

Fig. 9 is a fragmentary view similar to Fig. 3 showing a further modified form of the invention.

Fig. 10 is a fragmentary view similar to Fig. 3 showing a still further modified form of the invention.

Figure 1:
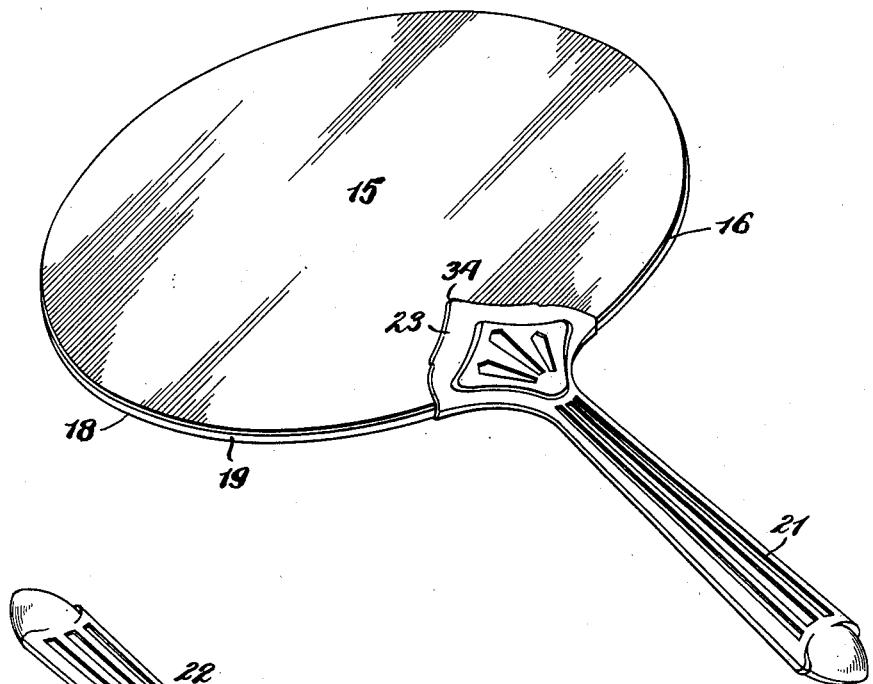
Fig. 1 is a perspective view of the obverse side of a hand mirror embodying our invention.

In the form of the invention shown in Figs. 1–5 the mirror proper is shown as comprising a piece of oval plate glass 15 having a beveled edge 16 and having its back silvered as indicated at 17, although it will be understood that various other reflective coatings can be applied instead of silver. This mirror is provided with a metal back 18 which conforms to the shape of the mirror and has its edge 19 turned around the edge of the mirror and engaging the bevel 16 so that the metal back completely encloses the rear side of the mirror and embraces the bevel all around its periphery. The metal backing may be of any form and finish but a pleasing finish is achieved by making the back of chromium plated metal and suitably dulling a part of the back to provide any desired design. In accordance with the form of the invention shown in Figs. 1–5, before the metal backing 18 is applied to the mirror a series of teats or buttons 20 are pressed outwardly from the metal backing plate along its long edge, these buttons being subsequently employed to anchor the handle as hereinafter described.

Figure 2:
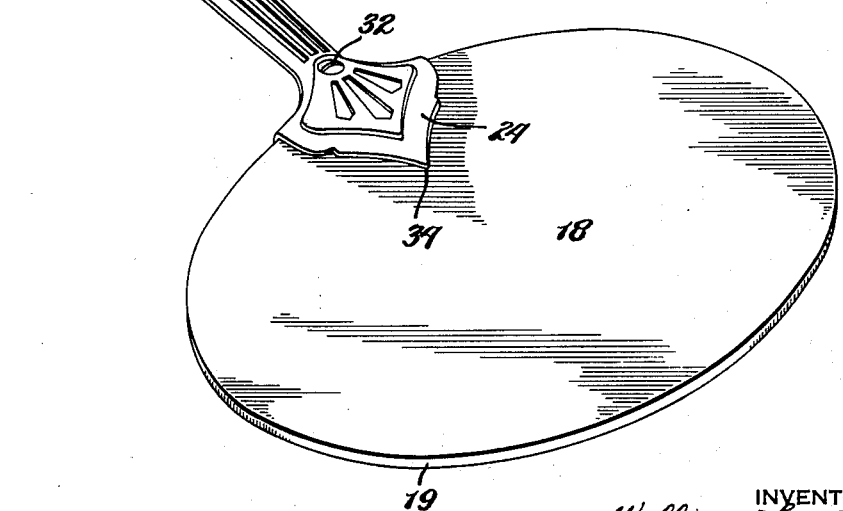
Fig. 2 is a perspective view of the reverse side thereof.

The handle shown in Figs. 1–5 consists of two sections 21 and 22, both of which are preferably die cast. These sections can be of any suitable configuration and the clamping end 23 of the section 21 and the clamping end 24 of the section 22 are preferably quite broad and pointed, as best illustrated in Figs. 1 and 2, so as to provide a reliable grip on the mirror proper both transversely of the handle and also longitudinally of the handle. By making the gripping portions 23 and 24 generally spade-shaped in this manner it is apparent that the field of the mirror is interfered with to the least extent.

The opposite end of the handle section 21 is formed to provide a boss 25 fitting into a recess 26 in the other handle section and the boss is also formed to provide an integral rivet 27 which fits into a hole 28 in the handle section 22, the end of the rivet 27 being spread out so as to hold the two handle sections together. Adjacent the spade-shaped end 23 of the handle section 21 an internal boss 30 is provided on this handle section, this boss fitting into a recess 31 in the other handle section 22. A clamping screw 32 extends through the handle section 22 and threads into the boss 30 so that upon tightening the screw 32 the clamping or spade-shaped ends 23 and 24 of the two handle sections are drawn together. For this purpose a tapering clearance is provided between the two handle sections around the screw 32, as indicated at 33 and the handle sections are also so formed that the points 34 of the spade-shaped ends 24 and 23 are closer together than the inner faces 35 of these ends. By this means when the screw 32 is tightened the points 34 of the spade-shaped ends first engage the mirror and the screw then draws the intermediate parts of the two handle sections together until the mirror proper is firmly clamped between the spade-shaped ends and the clearance 33 is taken up.

It has been found that the highly polished face of the plate glass and the metal backing prevent a reliable grip between the two handle sections and the mirror by frictional engagement alone and that a positive lock is necessary in order to prevent the mirror proper from being pulled free of the handle. Thus, regardless of how much the screw 32 is tightened and regardless of what type of friction facing may be interposed between the two clamping sections of the handle and the mirror, the mirror will not be reliably held. To provide a positive interlock between the mirror proper and the handle the buttons 20 of the metal backing 18 were provided and these buttons fit into corresponding recesses 38 in the handle section 22. In the form of the invention shown in Figs. 1-5, five of such buttons and interfitting recesses are provided and these have been found to firmly hold the mirror and handle against displacement since it would be necessary to shear the buttons off before the mirror could be separated by pulling in a plane parallel with the handle.

In Fig. 6 is illustrated a modified form of the invention which, instead of the integral rivet 27 at the outer end of the handle is provided with a screw 27a which screws into the boss 25a of the handle section 21a. This boss 25a fits into a recess 26a in the handle section 22a in the same manner as in the preferred construction. In the same manner as in the form of the invention shown in Figs. 1-5 a boss 30a is provided in one of the handle sections and fitting into a recess 31a of the other handle section. However, instead of passing the clamping screw 32a through this boss and recess this screw is passed through the mirror itself and for this purpose a hole 40 is provided through the glass plate 15a and its metal backing plate 18a. It is also apparent that instead of providing outwardly projecting buttons 20 on the metal backing plate these could be made to project inwardly, this form being illustrated in Fig. 6. Thus, the handle section 22a is provided with a plurality of buttons 41 which project into recesses 42 in the metal backing plate 18a. In order to accommodate the displaced metal in forming the recesses 42 in the metal backing plate corresponding depressions 43 are provided in the glass plate 15a of the mirror. It will be understood that the buttons and depressions 41 and 42 are in the same arrangement as the buttons and depressions 20 and 38 of the preferred form and that in other respects the two forms of the invention are identical.

Figs. 7 and 8 illustrate the form of the invention which is identical with the form of the invention shown in Figs. 1-5, except that instead of the buttons 20 and 38 the positive lock between the handle section and the mirror proper is provided by forming a semi-circular ridge 45 on the inner face of the reverse handle section and this ridge fits into a semi-circular bead 46 provided in the metal backing plate of the mirror. To receive this bead a semi-circular groove 47 is ground into the glass of the mirror. The ridge, bead and groove are all concentric with the clamping screw. Since in other respects this form of the invention is similar to that shown in Figs. 1-5 the same reference numerals have been employed but distinguished from the reference numerals of the preferred form by the suffix "b".

If desired the handle can be die cast in one piece and such a modification is illustrated in Fig. 9. In this form of the invention the handle 50 is solid and is bifurcated to provide a slot 51 and two clamping heads 53 and 54, these clamping heads being preferably spade-shaped in plan as with the other forms of the invention. In the form of the invention shown in Fig. 9 the glass plate 55 of the mirror is silvered as illustrated at 56 but is unprovided with a metal backing. The glass plate is also provided with a series of depressions 57 on its reverse side, preferably in the same arrangement and location as the depressions 43 in the form illustrated in Fig. 6. The clamping jaw 54 is provided with buttons or lugs 58 which fit into these depressions so as to provide a positive lock against the longitudinal separation of the handle from the mirror proper. The two spade-shaped clamping heads 53 and 54 are drawn together by a clamping screw 59, this screw extending through one of the bifurcations and engaging a threaded recess in the other bifurcation.

Fig. 10 illustrates another form of the invention in which the handle 60 is shown as being made in one piece and bifurcated to provide two clamping jaws 61 and 62 as in the form of the invention illustrated in Fig. 9, these clamping heads being also preferably spade-shaped and being drawn together by a clamping screw 63. In this form of the invention the silvered mirror plate 64 is provided with a metal backing plate 65, the edges of this backing plate being turned around the beveled edges of the mirror plate as in the forms of the invention illustrated in Figs. 1-8. The jaw 62 on the reverse side of the mirror is provided with a series of holes 66 extending therethrough and to secure a lock between this jaw and the metal plate 65 solder 67 is dropped into these openings thereby to unite the jaw and the metal backing plate. In Fig. 10 the mirror plate 65 is also illustrated as being cemented to the upper jaw 61 by a layer of a suitable cement 68. It will be understood that either or both of the uniting means shown in Fig. 10 can be employed, that is, the under jaw can be soldered to the metal backing plate or the mirror plate can be cemented to the corresponding other clamping jaw. However, in either case the clamping screw is essential to take the main strain, the cement or solder merely forming a positive connection to prevent endwise slipping of the handle relative to the mirror plate.

From the foregoing it is apparent that all of the forms of the present invention provide a rimless hand mirror and in which substantially the full area of the mirror plate is useful. This, of course, renders the mirror far more effective than hand mirrors having a rim which blanks off the edge of the mirror. Furthermore, the hand mirror shown is extremely attractive in appearance and by the combination of a positive lock and clamping means a firm and reliable connection is provided between the mirror proper and the handle. Further, by the use of die castings and a plated metal backing and because of the ease of assembly of the hand mirror the hand mirror can be produced and sold at very low cost.

We claim as our invention:

1. A mirror, comprising a mirror panel of substantial dimensions and weight, a single two piece support therefor, each section thereof having a jaw at one end adapted to engage the corresponding flat face of said panel, a lug provided on the inner face of one of said sections and fitting in a recess provided in the other section, means connecting the outer ends of said sections together and means for drawing said jaws together to clamp the panel therebetween thereby to secure a rigid connection between said support and panel.

2. A mirror, comprising a panel including a mirror plate and a metal backing plate secured to said mirror plate, a support for said panel including two clamping jaws adapted to engage the opposite flat faces of said panel, means for drawing the said jaws together to clamp the panel therebetween and a solder connection between said backing plate and the corresponding jaw.

3. A hand vanity mirror, comprising a relatively heavy glass mirror panel of substantial dimensions the opposite flat faces of which are parallel, a handle supporting said panel and having a single jaw adapted to engage a small portion of the edge and a small portion of the adjacent front face of said panel and a second single jaw adapted to engage said small portion of the edge and a small portion of the adjacent reverse face of said panel and means for drawing said jaws together to clamp the faces of said panel therebetween.

4. A hand vanity mirror, comprising a relatively heavy glass mirror panel of substantial dimensions the opposite flat faces of which are parallel, a handle supporting said panel and having a single jaw adapted to engage a small portion of the edge and a small portion of the adjacent front face of said panel and a second single jaw adapted to engage said small portion of the edge and a small portion of the adjacent reverse face of said panel and means extending through said jaws and arranged externally of said panel for drawing said jaws together to clamp the faces of said panel.

5. A hand vanity mirror comprising a relatively heavy glass mirror panel of substantial dimensions the opposite flat faces of which are parallel, a handle supporting said panel and comprising the sole support therefor and having a single jaw adapted to engage a small portion of the edge and a small portion of the adjacent face of said panel and a second jaw adapted to engage the small adjacent portion of the reverse face of said panel, means for drawing said jaws together to clamp the face of said panel therebetween and means independent of said clamping means for positively uniting one face of said panel with the inner face of the corresponding jaw to prevent planar displacement of said panel from between said jaws.

6. A hand vanity mirror, comprising a relatively heavy glass mirror panel of substantial dimensions the opposite flat faces of which are parallel, a handle supporting said panel and having a single jaw adapted to engage a small portion of the edge and a small portion of the adjacent face of said panel and a second single jaw adapted to engage a small adjacent portion of the reverse face of said panel and means for drawing said jaws together to clamp the faces of said panel therebetween.

7. A hand vanity mirror, comprising a relatively heavy glass mirror panel of substantial dimensions the opposite flat faces of which are parallel, a handle supporting said panel and having a single jaw adapted to engage a small portion of the edge and a small portion of the adjacent face of said panel and a second single jaw adapted to engage a small adjacent portion of the reverse face of said panel and means for drawing said jaws together to clamp the faces of said panel therebetween, comprising a shoulder provided on the reverse face of said panel and extending perpendicularly to the face thereof and engaging a cooperating shoulder provided on the inner face of said second jaw.

8. A hand vanity mirror comprising a relatively heavy glass mirror panel of substantial dimensions the opposite flat faces of which are parallel and having a metal backing plate, a handle supporting said panel and comprising the sole support therefor and having a single jaw adapted to engage a small portion of the edge and a small portion of the adjacent face of said panel and a second jaw adapted to engage the small adjacent portion of the reverse face of said panel, means for drawing said jaws together to clamp the face of said panel therebetween and means independent of said clamping means for positively uniting one face of said panel with the inner face of the corresponding jaw to prevent planar displacement of said panel from between said jaws, comprising an interlocking recess and projection formed in said backing plate and the inner face of the corresponding jaw.

9. A hand vanity mirror comprising a relatively heavy glass mirror panel of substantial dimensions the opposite flat faces of which are parallel and having a metal backing plate, a handle supporting said panel and comprising the sole support therefor and having a single jaw adapted to engage a small portion of the edge and a small portion of the adjacent face of said panel and a second jaw adapted to engage the small adjacent portion of the reverse face of said panel, means for drawing said jaws together to clamp the face of said panel therebetween and means independent of said clamping means for positively uniting one face of said panel with the inner face of the corresponding jaw to prevent planar displacement of said panel from between said jaws, comprising a raised projection in said metal backing plate extending perpendicularly to the plane of said panel and a cooperating recess on the inner face of the corresponding jaw.

10. A hand vanity mirror comprising a relatively heavy glass mirror panel of substantial dimensions the opposite flat faces of which are parallel and having a metal backing plate, a handle supporting said panel and comprising the sole support therefor and having a single jaw adapted to engage a small portion of the edge and a small portion of the adjacent face of said panel and a second jaw adapted to engage the small adjacent portion of the reverse face of said panel, means for drawing said jaws together to clamp the face of said panel therebetween and means independent of said clamping means for positively uniting one face of said panel with the inner face of the corresponding jaw to prevent planar displacement of said panel from between said jaws, comprising a series of raised buttons in said backing plate extending perpendicularly to its plane and a cooperating series of recesses in the inner face of the corresponding jaw.

WILLIAM LA HODNY.
GUST. C. HOFF.